May 22, 1928.
J. DE W. HIRES
1,670,966
SUN SHIELD
Filed June 9, 1926
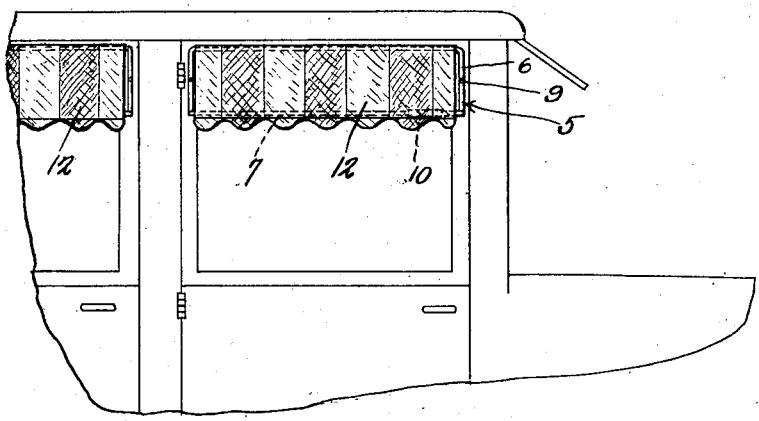
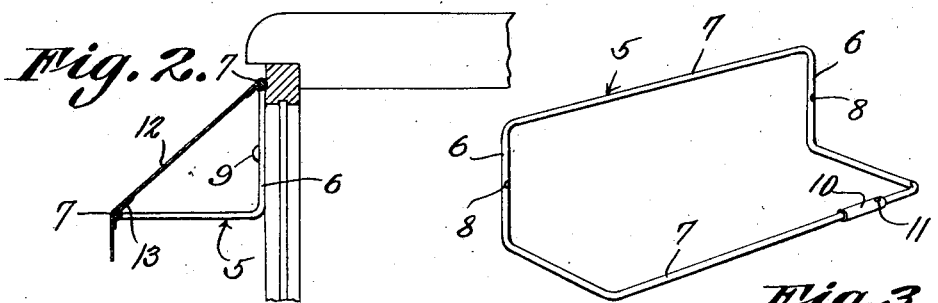
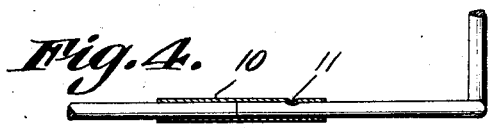
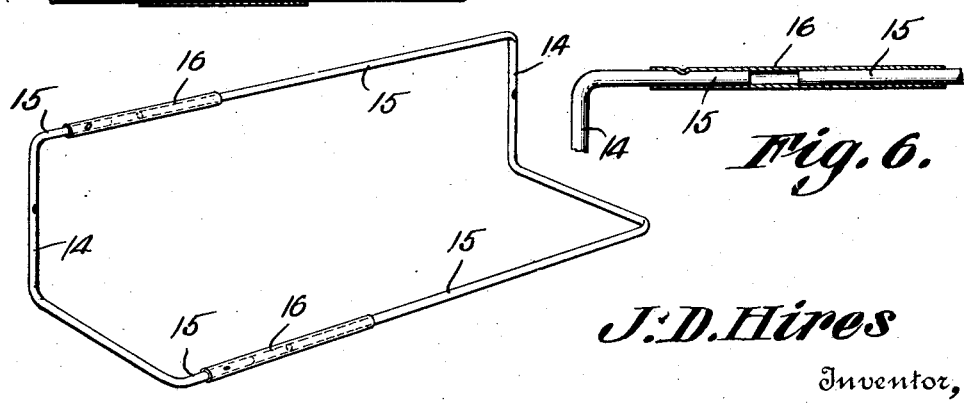
J. D. Hires
Inventor,
By C. A. Snow & Co.
Attorneys.

Patented May 22, 1928.

1,670,966

UNITED STATES PATENT OFFICE.

JOSEPH DE WITT HIRES, OF LUXORA, ARKANSAS, ASSIGNOR TO HIRES AUTO AWNING COMPANY, INCORPORATED, OF BLYTHEVILLE, ARKANSAS.

SUN SHIELD.

Application filed June 9, 1926. Serial No. 114,774.

The present invention has reference to sun and rain shields especially designed for use on motor vehicles of the closed type, the primary object of the invention being to provide a shield which will be exceptionally cheap to manufacture, and one which may be readily and easily positioned, by persons unfamiliar with mechanics.

An important object of the invention is to provide a device of this character which will comprise comparatively few parts, and one which will not rattle or be objectionable in any way while in use.

A still further object of the invention is to provide means for ventilating the car, and at the same time protect the opening made by lowering the window of a car, against rain entering the opening.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view illustrating a device constructed in accordance with the invention as installed.

Figure 2 is a sectional view through the device and window frame supporting the device.

Figure 3 is a perspective view of the preferred form of the device.

Figure 4 is a fragmental detail view illustrating the manner of connecting the ends of the rod of which the frame is constructed.

Figure 5 is a perspective view of a modified form of the invention, wherein the frame is adjustable.

Figure 6 is a sectional detail view illustrating the manner of connecting the adjustable sections of the frame.

Referring to the drawing in detail, the frame in the preferred form of the invention is indicated generally by the reference character 5 and embodies a length of heavy wire bent to provide right angled end sections 6 and parallel sections 7.

One of the right angled portions of each end section is formed with an opening 8 for the reception of a suitable securing screw indicated at 9, whereby the frame may be readily and easily secured to the frame of a window of a door or body of a car, with facility, and by persons unfamiliar with mechanics.

Secured to one end of the wire 5 of which the frame is constructed, is a sleeve 10 which is formed with a depressed portion 11 designed to bite into the wire adjacent to one end thereof to secure the sleeve in such a way that a portion of the sleeve will extend beyond one end of the wire to receive the opposite end of the wire, thereby securing the ends of the wire together in such a way as to prevent movement thereof with respect to each other.

As clearly illustrated by Figure 2 of the drawing, this frame is covered by a suitable fabric material indicated at 12 which may be looped around one of the side sections of the frame and sewed in such position, there being provided a securing strip 13 which may be positioned over the opposite side section and secured to hold the covering in an extended position.

In order to add to the appearance of the protector it is contemplated to scallop the edge of the fabric material that hangs over the lower side section of the frame so that the protector will simulate an awning.

In the form of the invention as illustrated by Figures 5 and 6 of the drawing, two lengths of heavy wire are employed in the frame construction, each length of wire being bent to provide a right angled end portion 14 and parallel side sections 15.

Elongated sleeves 16 are secured to the side portions at one end of the frame and extend appreciable distances beyond the ends of the side sections supporting them, to the end that when the side portions of the adjacent section are positioned in the sleeves, the sections may be moved towards or away from each other to accomplish an adjustment of the sections adapting the device for use in connection with windows of various widths.

From the foregoing it will be seen that due to this construction, a simple and efficient shield is provided, which may be positioned or secured to the window frame of a door or car construction to eliminate the direct sun rays on the occupants of the car and at the same time afford means for protecting the opening caused by lowering a window to ventilate the car, from rain which would otherwise pass through the opening.

I claim:

An awning including laterally adjustable sections, each section embodying a length of heavy wire material bent intermediate its ends to provide right angled portions, the ends of the lengths of wire extending laterally, one of the right angled portions of each section having an opening to receive a securing screw to secure the awning to a supporting structure, sleeves secured to the ends of one of the sections, said sleeves adapted to receive the ends of the opposite section to connect the sections for lateral adjustment, and a flexible cloth member stretched over the laterally extended ends of the sections.

In testimony that I claim the foregoing as my own, I have hereto affixed my signature.

JOSEPH DE WITT HIRES.